United States Patent
Popp

(10) Patent No.: US 8,369,662 B2
(45) Date of Patent: Feb. 5, 2013

(54) FIBER OPTIC ROTARY JOINT WITH EXTENDED TEMPERATURE RANGE

(75) Inventor: Gregor Popp, München (DE)

(73) Assignee: Schleifring und Apparatebau GmbH, Furstenfeldbruck (DE)

( * ) Notice: Subject to any disclaimer, the term of this patent is extended or adjusted under 35 U.S.C. 154(b) by 259 days.

(21) Appl. No.: 12/950,004

(22) Filed: Nov. 19, 2010

(65) Prior Publication Data

US 2012/0128297 A1    May 24, 2012

(51) Int. Cl.
   G02B 6/32      (2006.01)
   G02B 6/33      (2006.01)
   G02B 6/36      (2006.01)

(52) U.S. Cl. ............... 385/26; 385/33; 359/619

(58) Field of Classification Search ............. 385/26, 385/33, 79, 147; 359/619
See application file for complete search history.

(56) References Cited

U.S. PATENT DOCUMENTS

| | | | |
|---|---|---|---|
| 4,232,935 A | 11/1980 | Rohner et al. | |
| 5,037,173 A * | 8/1991 | Sampsell et al. | 385/17 |
| 5,359,684 A * | 10/1994 | Hosokawa et al. | 385/33 |
| 5,371,814 A | 12/1994 | Ames et al. | |
| 5,377,287 A * | 12/1994 | Lee et al. | 385/35 |
| 5,442,721 A | 8/1995 | Ames | |
| 7,246,949 B2 | 7/2007 | Thiele et al. | |
| 7,440,663 B2 | 10/2008 | Matsuo et al. | |
| 7,623,747 B2 | 11/2009 | De Montmorillon et al. | |
| 2002/0117625 A1* | 8/2002 | Pandelisev | 250/368 |
| 2002/0131699 A1 | 9/2002 | Raguin et al. | |
| 2003/0142923 A1 | 7/2003 | Geron et al. | |
| 2005/0063643 A1 | 3/2005 | Watanabe et al. | |
| 2011/0268387 A1* | 11/2011 | Popp | 385/33 |

FOREIGN PATENT DOCUMENTS

JP    2113213 A    4/1990

* cited by examiner

*Primary Examiner* — Akm Enayet Ullah
(74) *Attorney, Agent, or Firm* — Quarles & Brady LLP

(57) ABSTRACT

A fiber optic rotary joint has at least one fiber optic collimator. The fiber optic collimator has a plurality of lenses on a micro lens array. Furthermore a plurality of optical fibers are attached to the micro lens array. The fibers are further fixed by a fiber support. A spacer is provided between the micro lens array and the fiber support, setting the micro lens array and the fiber support apart from each other. The optical fibers have between the micro lens array and the fiber support a excess length greater than the distance between the micro lens array and the fiber support. This results in a slight bending of the fibers between the micro lens array and the fiber support. A temperature related extension of parts of the fiber optic rotary joint can be compensated by the excess length and does not lead to mechanical tension on the fibers.

13 Claims, 2 Drawing Sheets

FIBER OPTIC ROTARY JOINT WITH EXTENDED TEMPERATURE RANGE

BACKGROUND OF THE INVENTION

1. Field of the Invention

The invention relates to fiber optical rotary joints and a fiber optic collimators particularly for use in optical rotary joints.

2. Description of Related Art

Various fiber optical rotary joints are known for transmission of optical signals between units that are rotatable relative to each other.

U.S. Pat. No. 5,371,814 discloses an optical rotary joint for a plurality of channels, having a Dove prism. An arrangement having a plurality of GRIN lenses is provided for coupling light into or out of glass fibers. Beam coupling or decoupling is performed by several separate lenses. The optical fibers attached to the lenses are held by means of ferrules.

U.S. Pat. No. 5,442,721 discloses another optical rotary joint having bundled collimators assemblies. These allow a further decrease in size and increase in optical quality. Here also the optical fibers attached to the lenses are held by means of ferrules.

U.S. Pat. No. 7,246,949 B2 discloses a rotary joint using a micro lens array. Fibers are held by a lens system block which is also part of the micro lens system. Here no further fiber support is disclosed.

US Patent Application Publication 2003/0142923 A1 discloses a fiber optic array where the fibers are attached by epoxy to the ferrules and further to the array housing. This causes cracks and degradation of the optical fiber when temperature changes abruptly or very high or low temperatures are applied.

A smaller part of the losses can be caused by thermally induced micro- and macrobending of the fibre which can be reduced by using a "Bending Loss Insensitive Single Mode Optical Fibre" as is disclosed in U.S. Pat. No. 7,440,663 or U.S. Pat. No. 7,623,747.

SUMMARY OF THE INVENTION

The following description of various embodiments of optical rotary joints and fiber optic collimators is not to be construed in any way as limiting the subject matter of the appended claims.

The embodiments are based on the object of providing a fiber optic rotary joint having a fiber optic collimator and a fiber optic collimator where the fiber optic collimator includes a plurality of lenses on a micro lens array. The fiber optic collimator shall be usable within a broad temperature range and therefore shall be insensitive to a broad range of temperatures and abrupt temperature changes. Research has been done to figure out the effects of thermal degrading in fiber optic collimators having micro lens arrays having a plurality of lenses on a common substrate. Such effects are different from collimators using discrete lenses. It could be proved that the thermal degradation is almost caused by mechanical tension within the connection between the fiber and the micro lens array.

In an embodiment a fiber optic rotary joint has at least one derotating optical element having two sides being rotatable against each other and at least one collimator at each side of the derotating optical element. A fiber optic collimator comprises at least one lens array. The lens array may comprise a micro lens array having integrated lenses, a micro optical component with integrated lenses or individual micro lenses. Optical fibers are attached to the lens array or held in a position close to the lens array. A fiber carrier may be provided in close proximity to the lenses for precisely positioning and/or holding the fiber ends in relationship to the lenses. For rigidly securing the optical fibers and providing strain relief a fiber support is provided distant from the lens array. To keep the distance between the lens array and the fiber support preferably a spacer is provided. The optical fibers are fixed in the fiber support. They may be cemented into holes of the fiber support by means of epoxy or any other material. They may also be clamped, fused, soldered or welded into the fiber support. The fibers may also be held (and terminated) by one or more optical connectors attached to the fiber support. In such a case the fibers are indirectly attached to the fiber support via the connectors. The fiber support may also be a housing or box. The length of the fibers in the space between the lens array and the fiber support is selected such that it is longer than the distance between the lens array and the fiber support. This results in the fibers being at least slightly bent in the space between the lens array and the fiber support. Therefore there is no mechanical tension or force to the lens array or the fiber carrier. With varying temperatures the fibers can expand or shrink without asserting any force to the lens array or the fiber carrier. The length of the fibers may be selected sufficiently long so that even shrinking under extreme temperature conditions does not lead to mechanical tension or force to the lens array or the fiber carrier. The fibers have at least 1 mm excess length over the distance between the lens array and the fiber support. A 5 mm or even 10 mm excess length allows more flexibility. Preferably there is an excess length of about 1% to 10% of the distance between the lens array and the fiber support. The temperature coefficient of a glass fiber is in the order of 1e-6 1/K. Often the temperature coefficient of the spacer is larger than the temperature coefficient of the fiber. In an example it is 100e-6 1/K resulting in a length variation of 0.5% of the length at a temperature change of 50 degrees Kelvin. Accordingly the excess length must be sufficient to cover extension of the spacer due to thermal expansion of the spacer or any force applied to the spacer.

In a preferred embodiment the distance between the lens array and the fiber support is at least 30 mm. A distance of at least 50 mm allows better bending of the fibers and therefore further improvement. A further preferred embodiment comprises such a distance of 0.5 m to 2 m.

In another embodiment the spacer for keeping the lens array distant from the fiber support is a tubular member. It may be a metal tube, a flexible tube like a plastic tube, a corrugated tube, a conduit or a helical convoluted tubing. This tube may be compressible in its length to some extent, but it must have a maximum length which limits the maximum distance between the lens array and the fiber support. Here the excess length of the fibers must be sufficient to cover any extension in longitudinal directions if any force is applied to the tubular member, or the tubular member is bent or there is a thermal expansion. Specifically a tubular member like a corrugated tube offers some flexibility and bendability. It has a minimum bending radius due to its design and therefore protects the fibers from being bent with a too low radius or being broken. Furthermore a corrugated tube is a very stably outer shield which even protects from persons walking and cars driving over it.

In a further embodiment there is a junction box fixedly attached to the fiber support, the fiber support is a junction box itself or the fiber support is included in a junction box. Excess length of the fibers may be wound up in the junction box. Preferably the junction box has a panel with adapters for optical connectors. Optical connectors are attached to the fibers and mounted to the panel. In an alternative embodiment the junction box may be a splice cassette or splice tray for splicing of the fibers from the junction box.

In a further embodiment at least one of the fibers is a Bending Loss Insensitive Optical Fiber.

A further aspect of the invention relates to a fiber optic collimator as described above. Such fiber optic collimators may be used in a broad range of optical rotary joints including rotary joints with and without a derotating optical element. Furthermore they may be used in many kinds of optical couplers and connectors.

BRIEF DESCRIPTION OF THE DRAWINGS

In the following, the invention will be described by way of example, without limitation of the general inventive concept, on examples of embodiment and with reference to the drawings.

Figure 1:
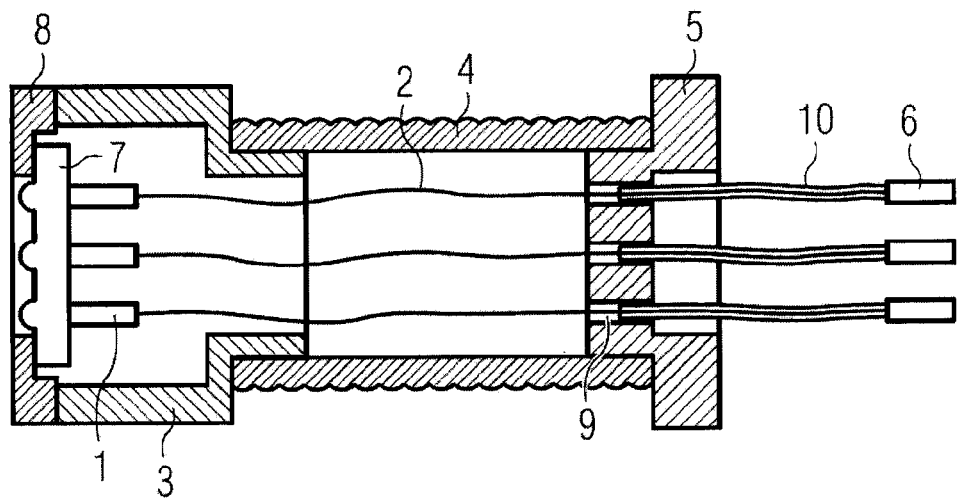
FIG. 1 shows a cross cut of a collimator system with a micro lens array.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows a side view of the fiber optic collimator. The lens array 7 is held by a carrier 8 and at least partially enclosed by a housing 3. The housing 3 extends by a tubular member 4, preferably a corrugated tube to a fiber support 5 for fixing the fibers and providing strain relief to the fibers parts located outside the collimator. The diameter of the tubular member is selected such that all the fiber are loosely held within and preferably optical connectors 6 may be fed through. Optical fibers 2 are attached at one end to the lens array 7 by ferrules 1. The other ends outside the collimator are attached to optical connectors 6. There may also be open ends or any other type of optical connection known in the art. The optical fibers pass through holes 9 or grooves of the fiber support 5 and are mechanically fixed to the fiber support. Preferably the groves or notches are filled with cement e.g. epoxy. The length of the optical fibers 2 is longer than the direct length between the ferrules 1 and the fiber support 5, so they are loose in the inner space of the housing 3 and the tubular member 4. A temperature related extension of parts of the fiber optic rotary joint can be compensated by the excess length and does not lead to mechanical tension on the fibers. The fibers may be bare or coated or coated on parts of the length in the space between the lens array and the fiber support. Preferably the fibers have tight buffers where the buffer is fixedly attached to the fiber or are designed as loose tubes where the fiber is held in a larger diameter tube. Outside the fiber support the fibers have sheaths 10 or jackets enhancing their stability. The sheaths are fixed at the fiber support or at any component connected to the fiber support.

Figure 2:
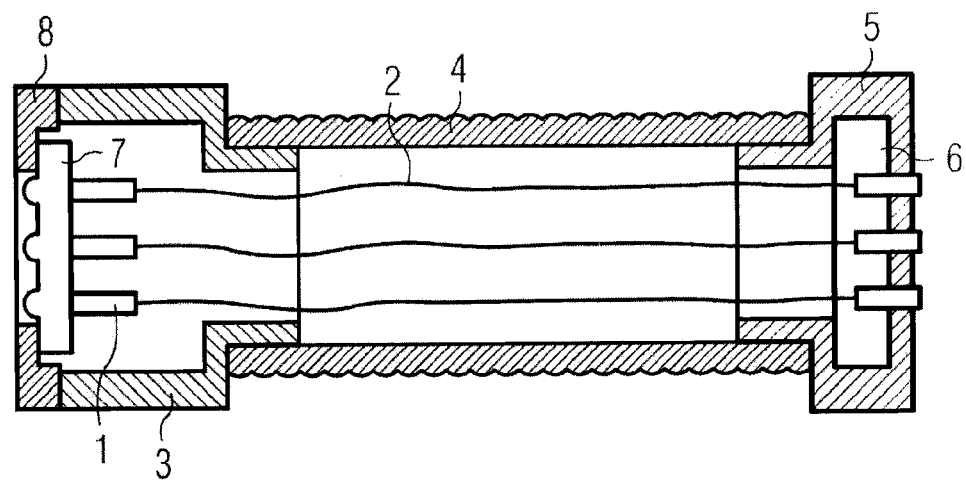
FIG. 2 shows a fiber optical rotary joint.

FIG. 2 shows a further embodiment of the fiber optic collimator. The fiber support holds optical connectors to which the fibers are connected.

Figure 3:
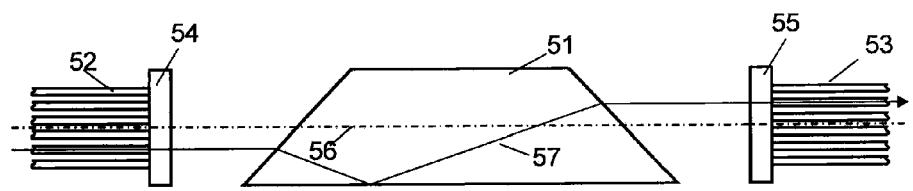
FIG. 3 shows in a schematic form an embodiment of an optical rotary joint having at least one fiber optic collimator.

FIG. 3 shows in a schematic form an embodiment of an optical rotary joint having at least one fiber optic collimator in accordance with the invention. It comprises a first fiber optic collimator 54 for coupling of first optical fibers 52, and also a second fiber optic collimator 55 for coupling of second optical fibers 53. The second fiber optic collimator 55 is supported to be rotatable relative to the first fiber optic collimator 54 about a rotation axis 56. A derotating element in the form of a Dove prism 51 is located in a beam path between the first fiber optic collimator 54 and the second fiber optic collimator 55 to compensate for the rotary movement. An example of a ray path of a light ray 57, which starts from one of the first optical fibers 52 and passes via the first fiber optic collimator 54, through the Dove prism 51, and via the second fiber optic collimator 55 up to and into one of the second optical fibers 53 is shown.

It will be appreciated to those skilled in the art having the benefit of this disclosure that this invention is believed to provide optical rotary joints and micro-optical systems, such as collimators, used for multi-channel transmission of optical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 1 ferrule
2 optical fiber
3 housing for lens array
4 spacer
5 fiber support
6 optical connector
7 lens array
8 carrier for lens array
9 hole
10 fiber sheath
51 derotating optical element
52 first optical fibers
53 second optical fibers
54 first fiber optic collimator
55 second fiber optic collimator
56 rotation axis
57 light ray

The invention claimed is:

1. A fiber optic rotary joint including an optical derotating element and at least one fiber optic collimator having
   a plurality of lenses on a micro lens array,
   a plurality of optical fibers attached to the micro lens array,
   a fiber support for fixing the fibers, wherein a spacer is provided between the micro lens array and the fiber support, setting the micro lens array and the fiber support apart from each other, and the optical fibers have between the micro lens array and the fiber support an excess length greater than the distance between the micro lens array and the fiber support.

2. The fiber optic rotary joint according to claim 1, wherein the excess length of the fibers is 1% to 10% of the distance between the micro lens array and the fiber support.

3. The fiber optic rotary joint according to claim 1, wherein the distance between the micro lens array and the fiber support is at least 30 mm.

4. The fiber optic rotary joint according to claim 1, wherein the spacer is a tube.

5. The fiber optic rotary joint according to claim 4, wherein the spacer is a corrugated tube.

6. The fiber optic rotary joint according to claim 1, wherein the fiber support is a housing holding fiber connectors to which the fibers are connected.

7. A fiber optic collimator having
a micro lens array with a plurality of micro lenses,
a plurality of optical fibers attached to the micro lens array,
a fiber support for fixing the fibers,
wherein a spacer is provided between the micro lens array and the fiber support, setting the micro lens array and the fiber support apart from each other, and
the optical fibers have between the micro lens array and the fiber support an excess length greater than the distance between the micro lens array and the fiber support.

8. The fiber optic collimator according to claim 6, wherein the excess length of the fibers is 1% to 10% of the distance between the micro lens array and the fiber support.

9. The fiber optic collimator according to claim 6, wherein the distance between the micro lens array and the fiber support is at least 30 mm.

10. The fiber optic collimator according to claim 6, wherein the spacer is a tube.

11. The fiber optic collimator according to claim 9, wherein the spacer is a corrugated tube.

12. The fiber optic rotary joint according to claim 7, wherein the fiber support is a housing holding fiber connectors to which the fibers are connected.

13. The fiber optic rotary joint according to claim 1, wherein at least one of the fibers is a Bending Loss Insensitive Optical Fiber.

* * * * *